Jan. 10, 1933.   J. S. OECHSLE   1,893,593
FLEXIBLE COUPLING
Filed June 21, 1929
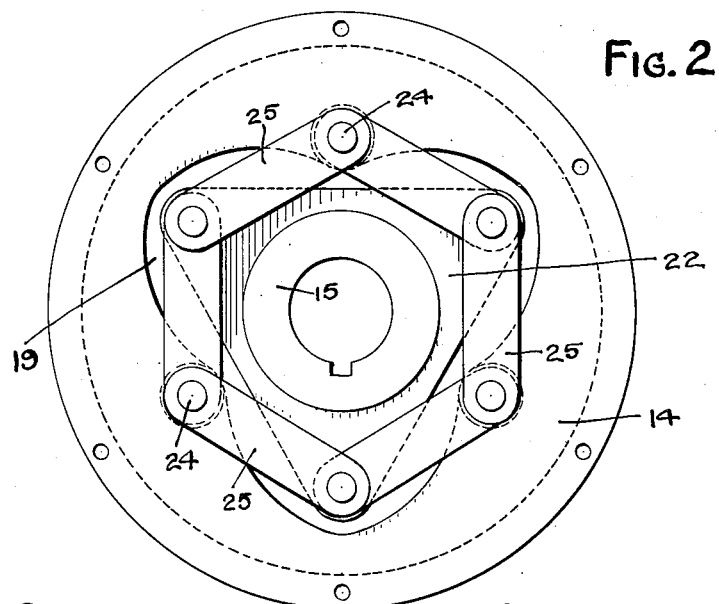
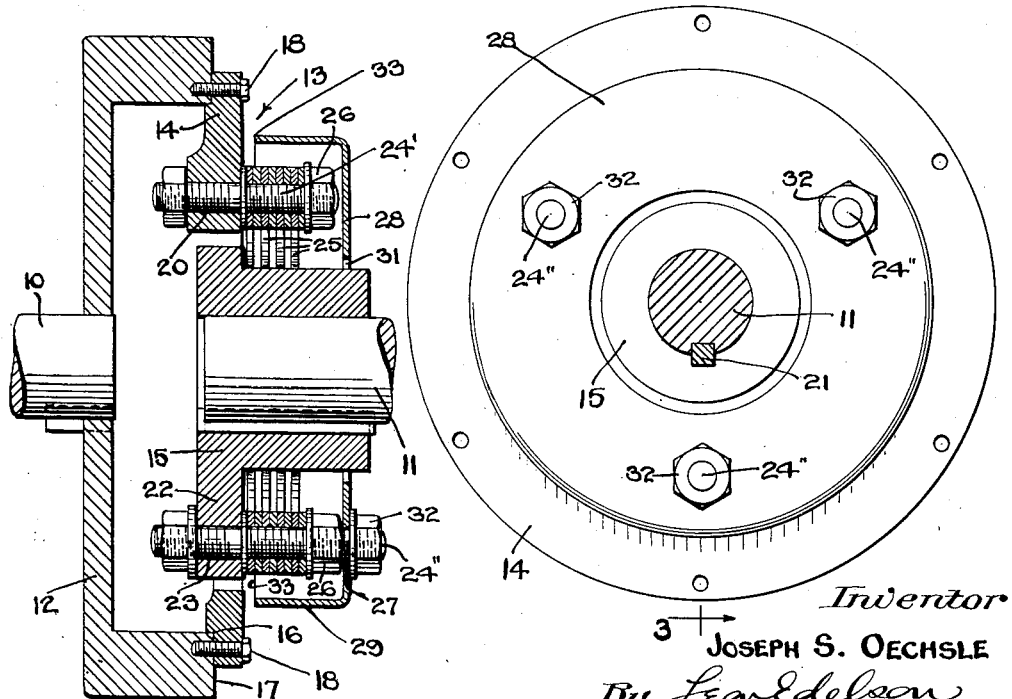
Inventor
JOSEPH S. OECHSLE
By Lea Edelson
Attorney.

Patented Jan. 10, 1933

1,893,593

UNITED STATES PATENT OFFICE

JOSEPH S. OECHSLE, OF PHILADELPHIA, PENNSYLVANIA, ASSIGNOR, BY MESNE ASSIGNMENTS, TO WORTHINGTON PUMP AND MACHINERY CORPORATION, OF NEW YORK, N. Y., A CORPORATION OF VIRGINIA

FLEXIBLE COUPLING

Application filed June 21, 1929. Serial No. 372,604.

This invention relates to coupling devices and more particularly to improvements in flexible couplings intended for transmitting power from one shaft to another.

Among the principal objects of the present invention is to provide a flexible coupling which is not only simple in construction and effective in operation, but which also requires a minimum of space for its installation.

A further object of the invention is the provision of a coupling device for interconnecting a pair of axially aligned power shafts, the device being provided with a pair of telescopically arranged members adapted for respective securement to the shafts to be coupled, said members being interconnected by flexible means disposed within planes defining the longitudinal limits of said members, thereby permitting the proximate ends of the shafts to be brought into close proximity with each other and at the same time permitting a limited axial misalignment to be had between said shafts.

Still further objects of the invention are to provide a coupling which is of maximum strength and durability, which is adapted to transmit power in either direction without introducing a "back-lash" condition or shocks incident to sudden starting and stopping, and which requires a minimum of lubrication to insure its constant and efficient operation.

Still another object of the present invention is the provision in a flexible link type of coupling of a combined protective and concealing means therefor, said means being so arranged and supported upon one of the primary coupling members that it not only serves to effectually preclude the entry of foreign matter therebetween but also does not interfere with the aforesaid axial misaligning movement between the shafts.

A still further object of the invention is the provision of a coupling device which is adapted to be interposed between the flywheel of a driving shaft and a driven shaft axially alined therewith, component parts of the device being so arranged that the flywheel may be readily detached therefrom to facilitate starting of the engine under no load.

Other and further objects and advantages of the invention will become apparent from the following detailed description of a preferred embodiment thereof.

The invention consists substantially in the combination, construction, location and relative arrangement of parts, all as will be described more fully hereinafter, as shown in the accompanying drawings, and as finally pointed out in the appended claims. In the accompanying drawing:—

Figure 1 is a frontal elevational view of a flexible coupling constructed in accordance with and embodying the principles of the present invention;

Figure 2 is a similar view thereof with the protective and concealing cover removed; and Figure 3 is a vertical sectional view taken on the line 3—3 of Figure 1.

Referring now more specifically to the drawing and particularly to Figures 1 and 2 thereof, it will be observed that the coupling constructed in accordance with the present invention is shown interposed between the proximate ends of a driving shaft 10 and a driven shaft 11, the former having keyed thereto a centrally recessed flywheel 12. The shafts 10 and 11 are ordinarily maintained in axial alignment but, due to the construction of my improved coupling, a limited axial misalignment is permitted therebetween without interfering with the efficient performance of or imposing destructive strains upon the coupling.

This coupling, which is generally designated by the reference numeral 13, comprises a driving coupling member 14 and a driven coupling member 15 suitably interconnected by flexible means to be presently described.

The driving member 14 is preferably of circular outline, the outer periphery thereof being rabbeted, as at 16, to provide an annular seat for the rearward face 17 of the flywheel. Bolts 18 are preferably employed for effecting securement of the driving member 14 to the flywheel 12. As appears most clearly in Figure 2, the driving member 14 is provided with a central opening 19 of generally triangular form, the side edges of this opening being each provided, intermediate the ends thereof, with internally threaded apertures 20. The axes of these apertures parallel the axis of the driving shaft 11 and are preferably so disposed that they define the apices of an equilateral triangle.

The driven coupling member 15 is suitably secured to the forward end of the driven shaft 11, preferably by a key 21, this coupling member being in the form of a sleeve at the forward end of which is formed a flange 22 of substantially triangular shape. As appears quite clearly in Figure 3 the coupling members 14 and 15 are so arranged with respect to each other that the flange 22 lies in a plane common to that of the driving disk 14. As in the case of the latter member, the flange 22 of the driven coupling member is also provided with internally threaded apertures 23 the axes of which parallel that of the driven shaft 11 and are so disposed that they also define the apices of an equilateral triangle.

Threadedly engaging the apertures 20 and 23 of the disk 14 and the flange 22, respectively, are a plurality of studs 24, the said disk and flange being relatively so arranged (see Fig. 1) that the studs are uniformly spaced about a circle passing commonly therethrough and normally coaxial with the shafts 11 and 10. For a purpose which will be apparent presently alternate studs project rearwardly beyond the common plane of the disk 14 and the flange 22 to a greater extent than do the studs next adjacent thereto. In the drawing the shorter studs are designated 24' and the larger studs 24", it being noted that in the present instance the longer studs are those which are secured to the flange 22.

Interconnecting the freely extending shanks of adjacent pairs of the studs are a plurality of flat links 25, these links being preferably in the form of spring steel stampings and accordingly more or less flexible. A plurality of these links (the drawing shows four) interconnect each shorter stud 24' with its next adjacent longer stud 24", the links of each set being arranged in spaced parallel planes with the ends thereof overlapping those of the next adjacent set. Nuts 26 are threaded upon the shanks of the studs 24 and serve to maintain the links in the assembled relation shown.

It will be observed at this point that the shanks of the longer studs 24" project rearwardly of these link-retaining nuts 26 and through suitable openings 27 provided in the rear wall of a housing 28 operatively associated with the coupling. As appears most clearly in Figure 3 this housing or enclosure is provided with an annular wall 29 of a diameter sufficient to embrace the closed circuit of flexible links. The rear wall of this housing is centrally apertured, as at 31, to permit the projection therethrough of the sleeve portion of the driven coupling member 15. Nuts 32, which threadedly engage the rear ends of the studs 24", serve to clamp the rear wall of the housing 28 securely against the link-retaining nuts 26. The housing 28 is thus supported by the driven coupling member independently of the driving disk 14. In order to permit axial misalignment between these driving and driven members without interference by the housing 28 the forward edge 33 of the annular wall 29 thereof terminates short of the disk 14. It will be obvious that the housing 28 serves to effectually preclude the entry of foreign matter within the coupling proper and yet does not interfere with the free movement between the coupling elements due to axial misalignment of the coupling shafts.

It will also be observed by reason of the telescopic relation between the driving and driven coupling members it becomes possible to present the ends of the shafts 10 and 11 with a minimum of clearance therebetween. This feature is often of paramount importance in those instances wherein a small space is available between the rear end of an engine crank-shaft and the forward end of a transmission shaft. It is also of importance to note that the present invention makes it possible to effectively utilize the usual central recess in a flywheel within which to house portions of the coupling. In addition to this it will be observed that the flywheel 12 may be uncoupled from the driven shaft 11 merely by removing the securing bolts 18. This is of particular importance in those cases where lubricant in the crankcase of the engine becomes hard, as in cold weather, so that it becomes desirable to turn the engine over under no load. In order to effect this the operator merely unloosens the bolts 18 which secure the driving shaft coupling member 14 to the flywheel and proceeds to turn the engine over to an extent sufficient to warm it up, after which the said coupling member is again secured to the flywheel.

It will be understood that the invention as herein disclosed is susceptible of various changes and modifications without departing from the real spirit or principles thereof, and it is intended accordingly to claim the invention broadly as well as specifically as indicated by the appended claims.

What is claimed as new and useful is:

1. In a flexible coupling, in combination, a driving coupling member in the form of a flat plate having a central substantially triangularly shaped opening, a driven coupling member in the form of a sleeve having a substantially triangularly shaped flange adapted to be disposed within said opening, a plurality of studs projecting axially and in the same direction from said plate and flange, the plate studs being arranged alternately with respect to the flange studs, and flexible means respectively interconnecting each plate stud with the flange stud next adjacent thereto.

2. In a flexible coupling, in combination, a driving coupling member in the form of a flat plate having a central substantially triangularly spaced opening, a driven coupling member in the form of a sleeve having a substantially triangularly shaped flange adapted to be disposed within said opening, a plurality of studs projecting axially and in the same direction from said plate and flange, the plate studs being arranged alternately with respect to the flange studs, flexible means respectively interconnecting each plate stud with the flange stud next adjacent thereto, and a cover embracing all of said studs and said flexible means, said cover being rigidly supported by one set of alternate studs.

3. In a flexible coupling, a driving coupling disc having an opening therein, a driven coupling member having an operating flange thereon positioned in said opening whereby said driving disc and operating flange lie in a common plane, a plurality of studs projecting axially and in the same direction from said plate and flange, the plate studs being arranged alternately with respect to the flange studs, and articulate connections between said studs.

4. In a flexible coupling, a driving coupling disc having an opening therein, a driven coupling member having an operating flange thereon positioned in said opening whereby said disc and flange lie in a common plane, a plurality of studs projecting axially in the same direction from said plate and flange, the plate studs being arranged alternately with respect to the flange studs and an articulated link connection between said driving disc and operating flange.

5. In a flexible coupling, a driving coupling disc having an opening therein, a driven coupling member having an operating flange thereon positioned in said opening whereby said disc and flange lie in a common plane, a plurality of studs projecting axially in the same direction from said plate and flange, the plate studs being arranged alternately with respect to the flange studs and an articulated link connection between said driving disc and operating flange, said flange-carried studs extended beyond the ends of the disc-carried studs, and a cover for all of said studs and connections supported by said flange-carried studs.

6. In a flexible coupling, a driving disc having an opening therein, a driven coupling member having an operating flange thereon positioned in said opening whereby said driving disc and operating flange lie in a common plane, an articulated link connection between said driving disc and operating flange, means connecting the links in said articulated link connection, and a cover supported by certain of said connecting means.

In testimony whereof, I have hereunto affixed my signature.

JOSEPH S. OECHSLE.